US012489196B2

(12) United States Patent
Li

(10) Patent No.: US 12,489,196 B2
(45) Date of Patent: Dec. 2, 2025

(54) ANTENNA STRUCTURE AND MOBILE DEVICE HAVING THE SAME

(71) Applicant: WISTRON NEWEB CORPORATION, Hsinchu (TW)

(72) Inventor: Jian-De Li, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 95 days.

(21) Appl. No.: 18/399,986

(22) Filed: Dec. 29, 2023

(65) Prior Publication Data

US 2024/0235006 A1 Jul. 11, 2024

(30) Foreign Application Priority Data

Jan. 5, 2023 (TW) ................................ 112100291

(51) Int. Cl.
*H01Q 1/22* (2006.01)
*H01Q 9/04* (2006.01)

(52) U.S. Cl.
CPC ......... *H01Q 1/2266* (2013.01); *H01Q 9/0421* (2013.01)

(58) Field of Classification Search
CPC ............. H01F 1/14708; H01F 1/15308; H01F 17/0013; H01F 17/04; H01F 2017/048; H01F 27/255; H01F 27/292
See application file for complete search history.

(56) References Cited

U.S. PATENT DOCUMENTS

| | | | | |
|---|---|---|---|---|
| 2010/0295737 | A1* | 11/2010 | Milosavljevic | H01Q 5/371 343/702 |
| 2011/0037680 | A1* | 2/2011 | Chiu | H01Q 9/0421 343/893 |
| 2016/0365640 | A1* | 12/2016 | Minard | H01Q 1/38 |
| 2021/0242567 | A1* | 8/2021 | Wang | H01Q 1/245 |
| 2022/0311126 | A1* | 9/2022 | Hou | H01Q 1/243 |
| 2023/0198150 | A1* | 6/2023 | Feng | H01Q 9/42 343/702 |
| 2023/0402737 | A1* | 12/2023 | Lai | H01Q 5/385 |

(Continued)

FOREIGN PATENT DOCUMENTS

| | | | |
|---|---|---|---|
| TW | 201703350 | A | 1/2017 |
| TW | 202023113 | A | 6/2020 |

*Primary Examiner* — Thien M Le

(74) *Attorney, Agent, or Firm* — McClure, Qualey & Rodack, LLP

(57) ABSTRACT

An antenna structure is arranged on a metal back cover. The metal back cover has an L-shaped slot, which has first and second partitions respectively arranged along a first direction and a second direction that are perpendicular to one another. The antenna structure includes an L-shaped radiating element that partially overlaps with the second partition and includes a first radiating portion, a second radiating portion, and a grounded radiating portion. The first radiating portion and the second radiating portion extend along the second direction. One end of the second radiating portion is connected to the first radiating portion. A first feeding point is disposed between the first radiating portion and the second radiating portion. The grounded radiating portion is extended along the first direction and connected to another end of the second radiating portion. The grounded radiating portion has a first grounded side grounded through a capacitive element.

20 Claims, 8 Drawing Sheets

(56) References Cited

U.S. PATENT DOCUMENTS

| | | | | |
|---|---|---|---|---|
| 2024/0266747 | A1* | 8/2024 | Wang | H01Q 1/38 |
| 2024/0304982 | A1* | 9/2024 | Wu | H01Q 13/18 |
| 2025/0112360 | A1* | 4/2025 | Wu | H01Q 13/106 |

* cited by examiner

ANTENNA STRUCTURE AND MOBILE DEVICE HAVING THE SAME

CROSS-REFERENCE TO RELATED PATENT APPLICATION

This application claims the benefit of priority to Taiwan Patent application Ser. No. 11/210,0291, filed on Jan. 5, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a structure and a device, in particular to an antenna structure and a mobile device having the same.

BACKGROUND OF THE DISCLOSURE

With the continuous evolution of communication protocols, the bandwidth of some existing communication protocols is not enough for use. The 5th generation communication protocol has agreed on adding Frequency Range 1 (FR1) and Frequency Range 2 (FR2) to meet future frequency band requirements. Among them, FR1, also known as sub-6G, broadens the bandwidth of LTE-A to the frequency band of 410 MHz~7125 MHz. However, since the existing mobile devices (such as notebook computers) have installed full-bandwidth antennas in a limited mechanical space, it is difficult to further provide a wider frequency band.

In addition, to improve the appearance of mobile devices, designers often enlarge the display-to-body ratio to obtain a larger screen, resulting in a narrower edge of the screen, which limits the radiation space of the antenna and interacts negatively with the antennas in the device, resulting in a narrow bandwidth and degrading its overall wireless communication quality.

With the advent of 5G communication, there are more and more sub-6G (410 MHz~7125 MHz) frequency bands, and MIMO technology also requires more antennas to be combined in a single device, thereby further reducing the size of the antenna. Therefore, it is necessary to provide an antenna structure and design capable of covering the entire sub-6G frequency band for mobile devices.

SUMMARY OF THE DISCLOSURE

The technical problem to be solved by the present disclosure is to provide an antenna structure and a mobile device having the same for the deficiencies in the conventional technology.

In order to solve the above-mentioned problems, one of the technical aspects adopted by the present disclosure is to provide an antenna structure arranged on the metal back cover. The metal back cover has an L-shaped slot. The L-shaped slot has a first partition arranged along a first direction and a second partition arranged along a second direction. The first partition has an open end, the second partition has a closed end, and the first direction is perpendicular to the second direction. The antenna structure includes an L-shaped radiating element. The L-shaped radiating element is partially overlapped with the second partition and includes a first radiating portion, a second radiating portion, and a grounded radiating portion. The first radiating portion is extended along the second direction. The second radiating portion is extended along the second direction, and one end of the second radiating portion is connected to the first radiating portion. A first feeding point is provided at a junction of the first radiating portion and the second radiating portion. A grounded radiating portion is extended along the first direction, connected to another end of the second radiating portion, and has a first grounded side. The first grounded side is grounded through a capacitive element.

In order to solve the above-mentioned problems, another one of the technical aspects adopted by the present disclosure is to provide a mobile device including a metal back cover and an antenna structure. The metal back cover has an L-shaped slot. The L-shaped slot has a first partition arranged along a first direction and a second partition arranged along a second direction. The first partition has an open end, the second partition has a closed end, and the first direction is perpendicular to the second direction. The antenna structure is arranged on the metal back cover and includes an L-shaped radiating element, a middle radiating element, and a grounded radiating element. The L-shaped radiating element is partially overlapped with the second partition and includes a first radiating portion, a second radiating portion, and a grounded radiating portion. The first radiating portion is extended along the second direction. The second radiating portion is extended along the second direction, and one end of the second radiating portion is connected to the first radiating portion. A first feeding point is provided at a junction of the first radiating portion and the second radiating portion. The grounded radiating portion is extended along the first direction, connected to another end of the second radiating portion, and has a first grounded side. The first grounded side is grounded through a capacitive element. The middle radiating element is disposed between the L-shaped slot and the L-shaped radiating element and includes a third radiating portion, a fourth radiating portion, and a feeding portion. The third radiating portion is extended from an inner corner of the L-shaped slot along the second direction. The fourth radiating portion is disposed between the third radiating portion and the L-shaped radiating element, extended along the second direction, connected and perpendicular to the third radiating portion. A feeding portion is formed by branches from the branch point of the third radiating portion along the first direction, and has a second feeding point electrically connected to the first feeding point FD1. A grounded radiating element is coplanar with the third radiating portion, arranged on the side of the third radiating portion close to the second partition, and extended along the second direction D2. The end of the grounded radiating element in the first direction has a second grounded side that is grounded. The middle radiating element and the L-shaped slot are coupled to generate a first frequency band, a portion of the third radiating portion extended from the branch point towards the inner corner generates a second frequency band, a portion of the third radiating portion extended from the branch point towards the second direction and the first radiating portion are configured to generate a third frequency band, the grounded radiating element is configured to generate the fourth frequency band, and the capacitive element is configured to increase the bandwidth of the first frequency band.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
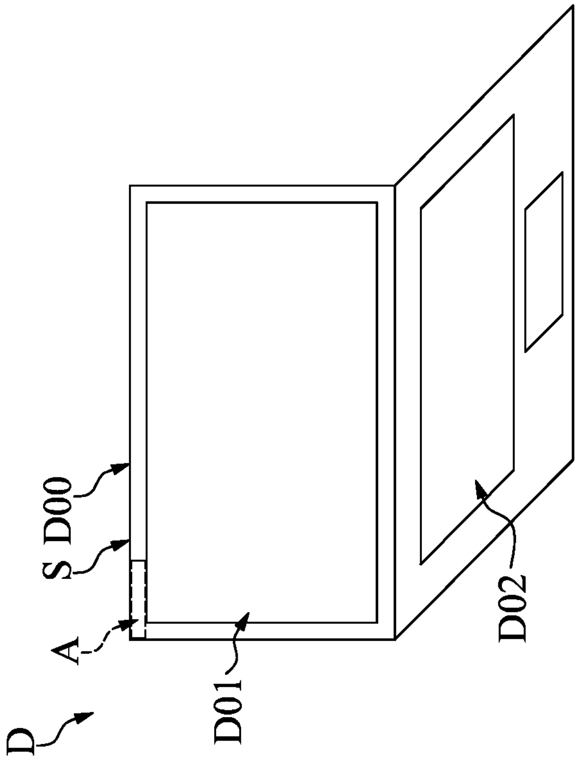
FIG. 1 is a schematic view of a configuration of a mobile device and its antenna structure according to embodiments of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

FIG. 1 is a schematic view of a configuration of a mobile device and its antenna structure according to embodiments of the present disclosure. As referred to FIG. 1, the embodiments of the present disclosure provides a mobile device D including a metal back cover S and an antenna structure A. The metal back cover S can be a metal housing configured for the mobile device D. For example, the mobile device D is a notebook, but the present disclosure is not limited thereto. The metal back cover S can be an upper cover D0 of the notebook. The position of the antenna A is arranged on the periphery of a monitor D01 or surrounds a keyboard D02, but the present disclosure is not limited thereto. The mobile device D and the metal back cover S can also be, such as a tablet and its metal back cover.

Figure 2:
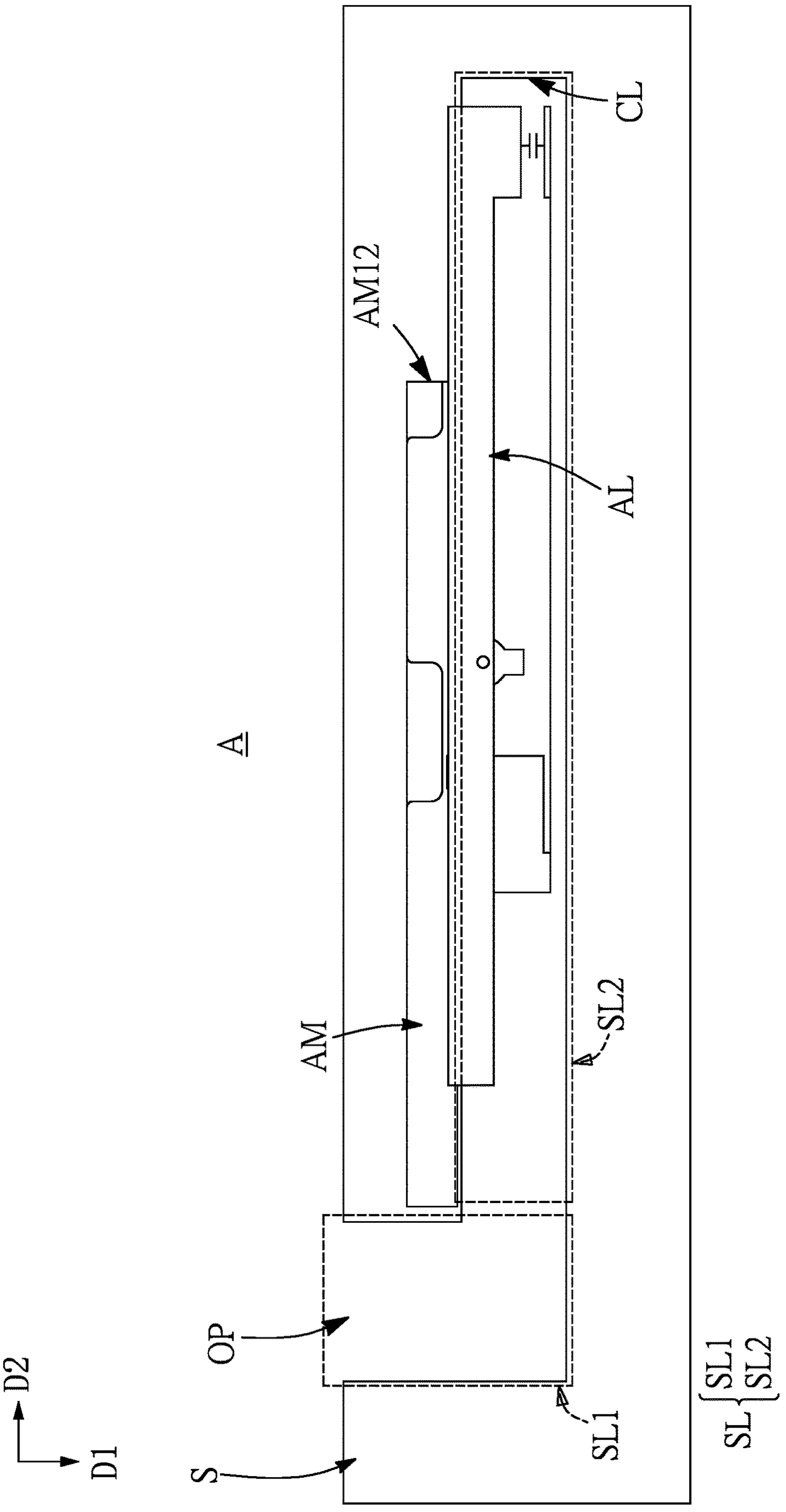
FIG. 2 is a first schematic top view of the antenna structure according to the embodiments of the present disclosure.

FIG. 2 is a first schematic top view of the antenna structure according to the embodiments of the present disclosure. As shown in FIG. 2, from a first side of the metal back cover S, the metal back cover S has an L-shaped slot SL. The L-shaped slot SL has a first partition SL1 arranged along a first direction D1, and a second partition SL2 arranged along a second direction D2. The first partition SL1 has an open end OP. The second partition SL2 has a closed end CL, and the first direction D1 is perpendicular to the second direction D2. In the embodiments of the present disclosure, the first partition SL1 and the second partition SL2 are rectangular, and the side length of the first partition SL1 in the first direction D1 is smaller than the side length of the second partition Sl2 in the second direction D2, so as to form an L-shaped slot SL in which its short side is adjacent to the open end OP and its long side is adjacent to the closed end CL. In addition, in some embodiments, the side length of the first partition SL1 in the second direction D2 can be greater than the side length of the second partition SL2 in the first direction D1.

In optional embodiments, the side length of the first partition SL1 in the first direction D1 may be within a range of 8 mm to 11 mm, preferably within a range of 9 mm to 10 mm. The side length of the first partition SL1 in the second direction D2 may be within a range of 3 mm to 8 mm, preferably within a range of 4 mm to 7 mm. In optional embodiments, the side length of the second partition SL2 in the first direction D1 may be within a range of 1 mm to 8 mm, preferably within a range of 2 mm to 5 mm. The side length of the second partition SL2 in the second direction D2 may be within a range of 55 mm to 60 mm, preferably within a range of 56 mm to 59 mm. In addition, in optional embodiments, the distance between the second partition SL2 and the nearest edge of the metal back cover S may be within a range of 4 mm to 9 mm, preferably within a range of 5 mm to 7 mm.

Figure 3:
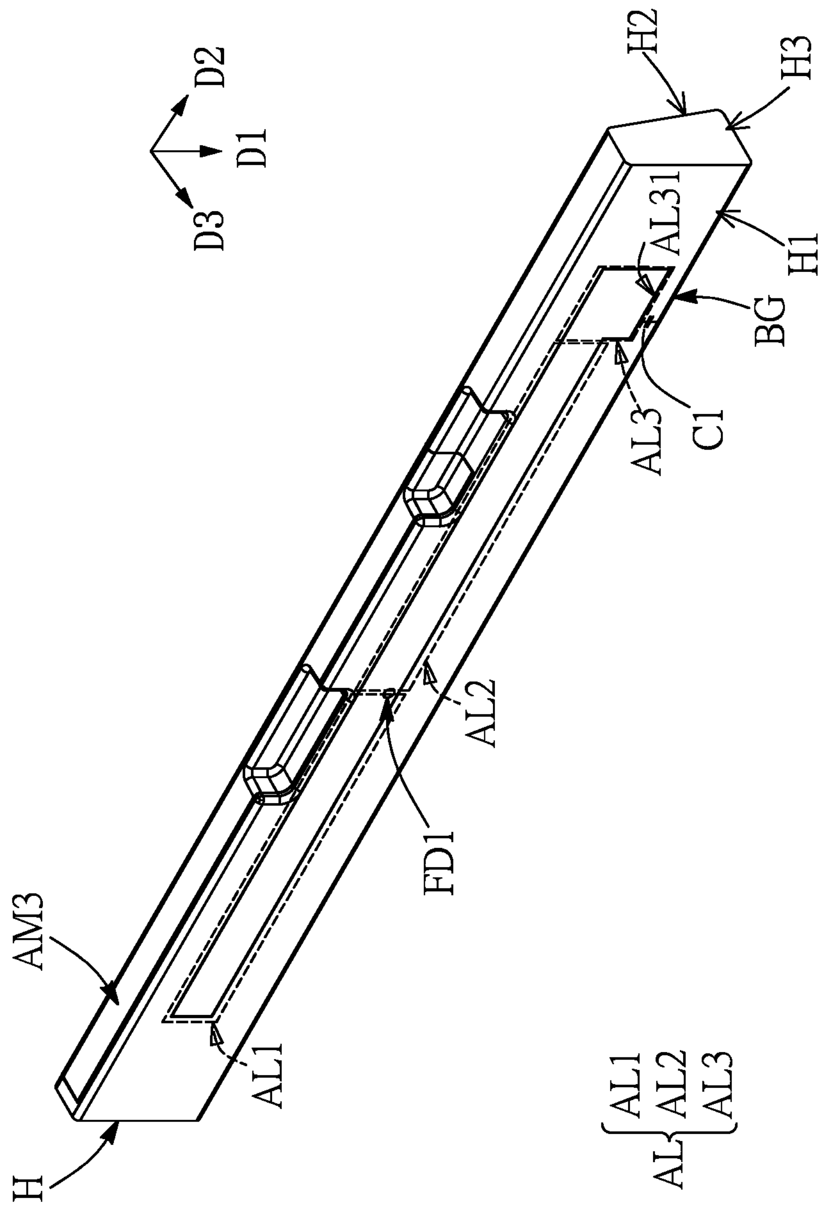
FIG. 3 is a schematic view of the antenna structure arranged on a carrier plate according to the embodiments of the present disclosure.

FIG. 3 is a schematic view of the antenna structure arranged on a carrier plate according to the embodiments of the present disclosure. As shown in FIG. 3, the antenna structure A can be made of metal materials, such as copper, silver, alumina, iron, or their alloys. The antenna structure A may include a carrier plate H arranged on the L-shaped slot SL. The carrier plate H can be, for example, a stereoscopic plastic holder with an upper surface H1, a lower surface H2, and a side surface H3 connected between the upper surface H1 and the lower surface H2. However, in order to avoid visual block and make the present disclosure easier to be understood by the reader, in other figures other than FIG. 3, the carrier plate H is shown as a transparent element, which is arranged on the metal back cover S. One or more metal radiating elements included in the antenna structure A can be arranged around the carrier plate H. In some embodiments, the antenna structure A may also include a non-conductive material for filling in the L-shaped slot SL.

It is noted that the embodiments of the present disclosure can adopt the Laser-Direct-Structuring (LDS) technique to control the movement of the laser according to the contour of the designed radiating element pattern and project the laser onto the molded stereoscopic plastic carrier plate to form a metal antenna pattern.

Figure 4:
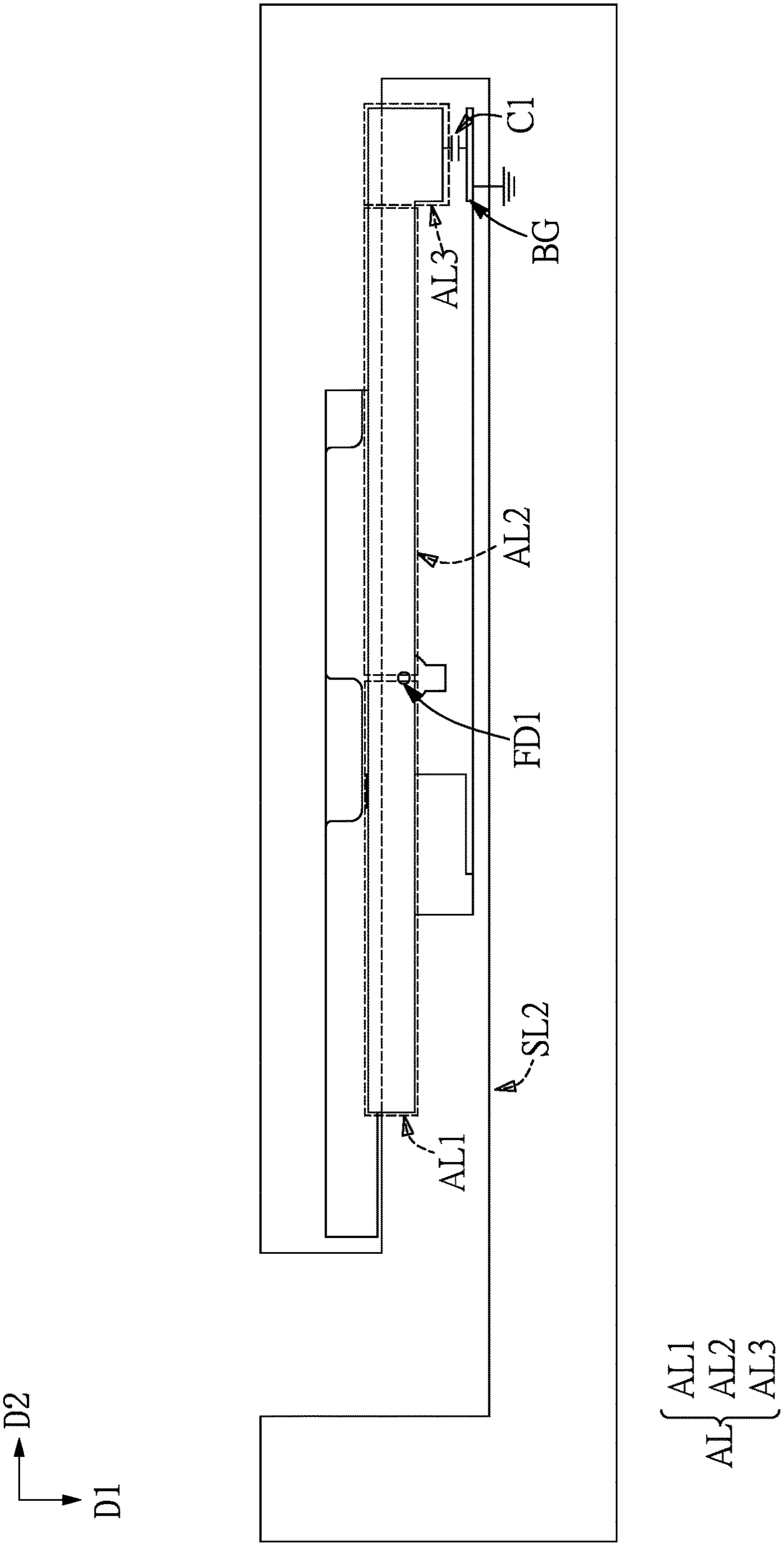
FIG. 4 is a second schematic top view of the antenna structure according to the embodiment of the present disclosure.

FIG. 4 is a second schematic top view of the antenna structure according to the embodiment of the present disclosure. FIG. 4 is substantially similar to FIG. 2, and only components relevant to an L-shaped radiating element AL are highlighted. As shown in FIG. 4, the antenna structure A includes the L-shaped radiating element AL. The L-shaped radiating element AL can be arranged on the upper surface H1 of the carrier plate H, overlapped with the second partition SL2, and includes a first radiating portion AL1, a second radiating portion AL2, and a grounded radiating portion AL3.

The first radiating portion AL1 and the second radiating portion AL2 are extended along the second direction D2. One end of the second radiating portion Al2 is connected to the first radiating portion AL1, and a feeding point FD1 is provided at a junction of the first radiating portion AL1 and the second radiating portion AL2. In optional embodiments, side lengths of the first radiating portion AL1 and the second radiating portion AL2 in the first direction D1 may be within a range of 0.5 mm to 5 mm, preferably within a range of 4 mm to 4 mm. A total length of the first radiating portion AL1 and the second radiating portion AL2 in the second direction D2 may be within a range of 35 mm to 45 mm, preferably within a range of 38 mm to 41 mm.

On the other hand, the grounded radiating portion AL3 is extended along the first direction D1, connected to another end of the radiating portion AL2, and has a first grounded side AL31. For example, in some embodiments, the grounded radiating portion AL3 can be arranged adjacent to the closed end CL. An end of the grounded radiating portion AL3 is extended along the first direction D1 which acts as a first grounded side AL31, and the first grounded side AL31 is grounded through a capacitor C1. In optional embodiments, the side length of the grounded radiating portion AL3 in the second direction D2 may be within a range of 4 mm to 8 mm, preferably within a range of 3 mm to 5 mm.

More specifically, reference can be made to FIG. 3. The first grounded side AL31 is connected to a bottom grounded element BG through the capacitor C1. It is noted that, in the embodiments of the present disclosure, since the shape of the capacitive element is not a key issue in the present disclosure, and an appropriate type of the capacitor can be selected according to the requirement, thus the capacitive element is simply shown in the figures with a circuit symbol. The relative connection relationship in the antenna structure A is simply represented by a line segment connected with the capacitive symbol.

Specifically, the first feeding point FD1 is a signal feeding position. The energy is entered from the first feeding point FD1 so that the L-shaped radiating element AL coupled with the L-shaped slot SL and other components can resonance and generate radiation energy in a desired frequency band.

Figure 5:
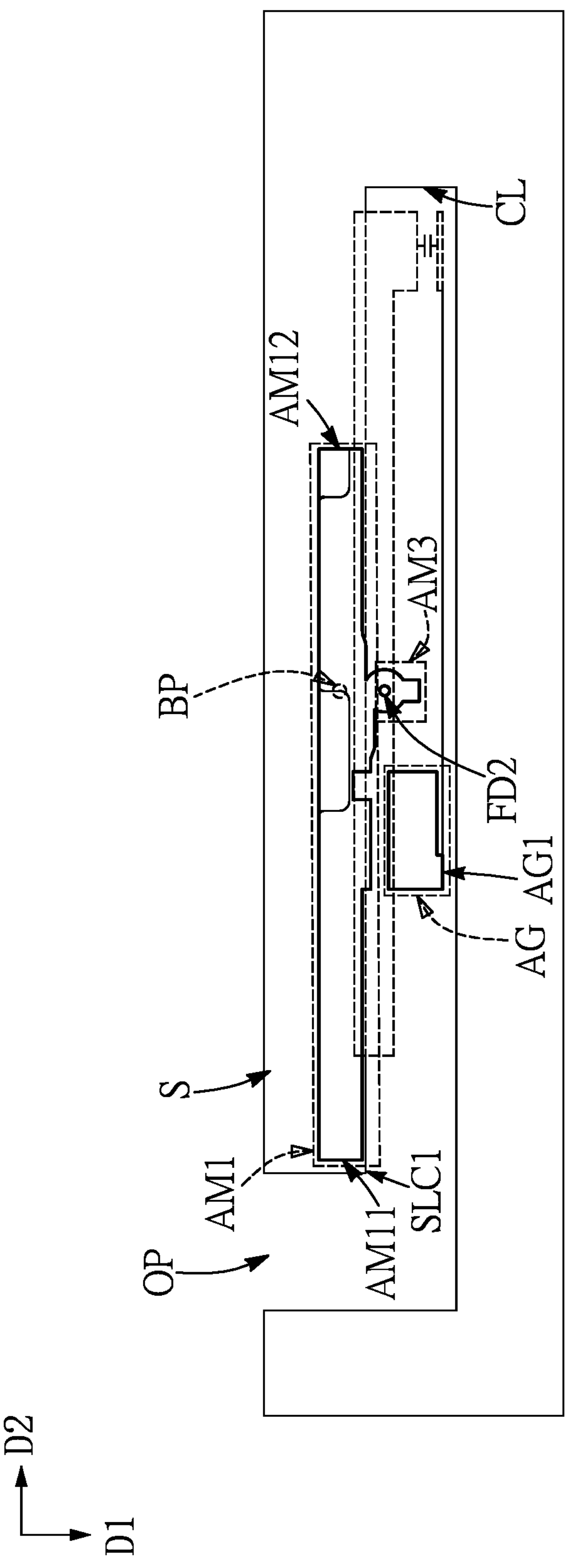
FIG. 5 is a third schematic top view of the antenna structure according to the embodiments of the present disclosure.
Figure 6:
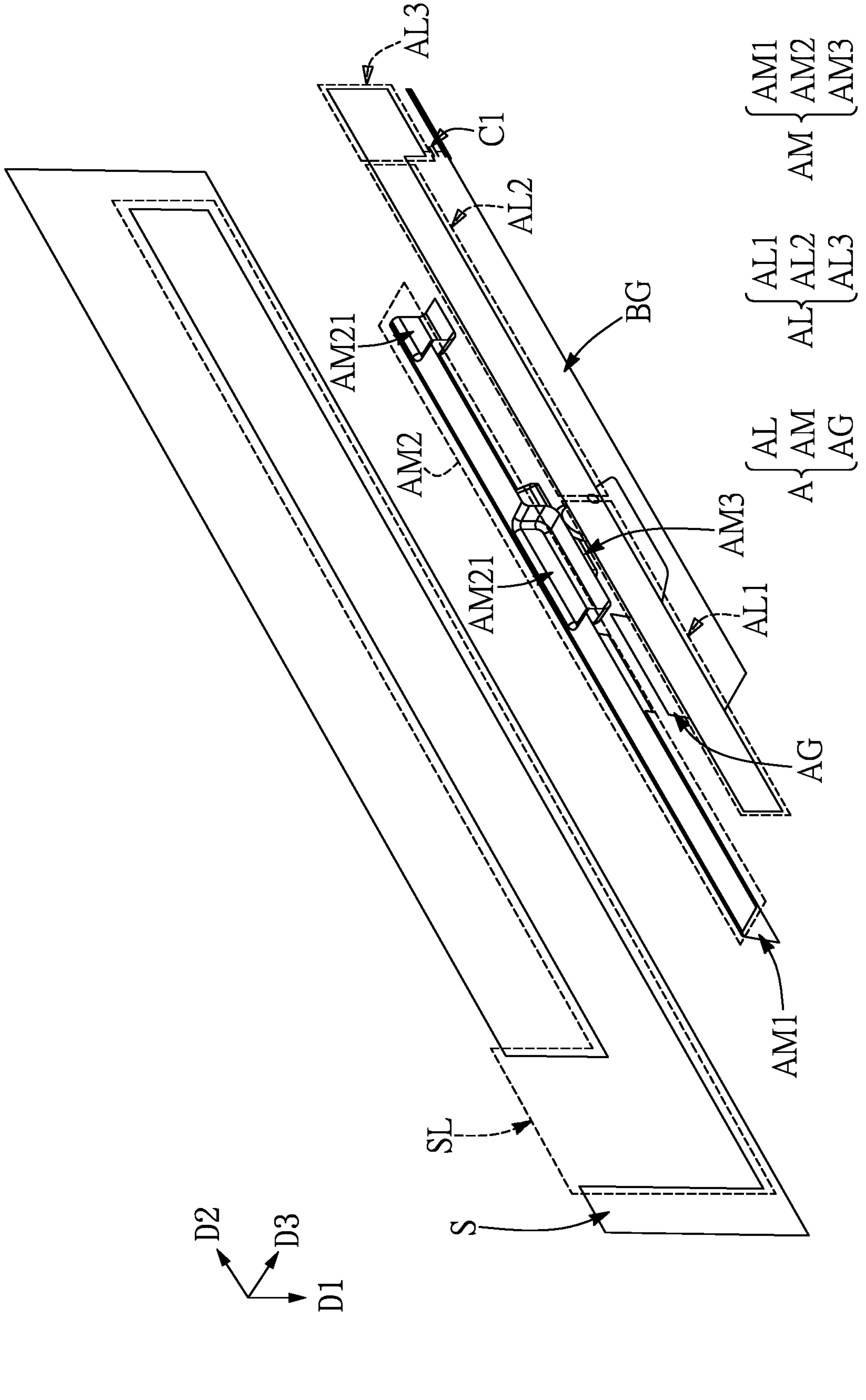
FIG. 6 is a schematic view of an L-shaped radiating element, a middle radiating element, and a grounded radiating element of the antenna structure according to the embodiments of the present disclosure.

FIG. 5 is a third schematic top view of the antenna structure according to the embodiments of the present disclosure. FIG. 6 is a schematic view of the L-shaped radiating element, the middle radiating element, and the grounded radiating element of the antenna structure according to the embodiments of the present disclosure. It is noted that FIG. 5 is substantially similar to FIG. 2, and only components relevant to the middle radiating element and the grounded radiating element are highlighted. Meanwhile, the L-shaped radiating element is hidden by dotted lines. On the other hand, FIG. 6 is based on FIG. 3 in which the carrier plate H is omitted to illustrate the relative relationship and specific details of the L-shaped radiating element, the middle radiating element, and the grounded radiating element in the antenna structure of the present disclosure.

As shown in FIG. 5 and FIG. 6, the antenna structure A further includes a middle radiating element AM disposed between the L-shaped slot SL and the L-shaped radiating element AL, and the middle radiating element AM includes a third radiating portion AM1, a fourth radiating portion AM2, and a feeding portion AM3. More specifically, the middle radiating element AM is disposed between the L-shaped slot SL and the L-shaped radiating element AL in a third direction D3, and the third direction D3 is perpendicular to the first direction D1 and the second direction D2, as shown in FIG. 6.

From the top view of FIG. 5, the third radiating portion AM1 can be a stripe-shaped metal conductive element with a rectangular body, and is extended from an inner corner SLC1 of the L-shaped slot SL along the second direction D2. More specifically, in the top view, the rectangular main body of the third radiating portion AM1 is not overlapped with the L-shaped slot SL, which starts from the metal back cover S on the inner side of the L-shaped slot SL and is extended along the second direction D2 till proximity to the closed end CL. Therefore, in some embodiments, the length of the third radiating portion AM1 in the second direction D2 is smaller than the total length of the second partition SL2 in the second direction D2. In optional embodiments, the total length of the third radiating portion AM1 in the second direction D2 may be within a range of 32 mm to 40 mm, preferably within a range of 34 mm to 38 mm.

From the schematic view of FIG. 6, the fourth radiating portion AM2 can be disposed between the third radiating portion AM1 and the L-shaped radiating element AL, which is extended along the second direction D2, and is connected and perpendicular to the third radiating portion AM1. Similar to the shape of the third radiating portion AM1, the fourth radiating portion AM2 can also include a rectangular body perpendicular to the third radiating portion AM1. The third radiating portion AM1 and the fourth radiating portion AM2 may have the same length in the second direction D2, but the present disclosure is not limited thereto. In other embodiments, the third radiating portion AM1 and the fourth radiating portion AM2 may have different lengths in the second direction D2 according to design requirements. In addition, in optional embodiments, from the top view, the third radiating portion AM1 and the fourth radiating portion AM2 are not overlapped with the second partition SL2 of the L-shaped slot SL. However, the present disclosure is not limited thereto. In some other embodiments, from the top view, the third radiating portion AM1 and the fourth radiating portion AM2 can be overlapped with the second partition SL2 of the L-shaped slot SL according to design requirements.

In addition, to arrange and fix the middle radiating portion AM relative to the L-shaped slot SL, the metal back cover S, and the L-shaped radiating element AL, it can be achieved by fixing the middle radiating portion AM on the carrier plate H. For example, the fourth radiating portion AM2 can be configured with one or more recesses AM21 to be fastened with the carrier plate H so that the middle radiating element AM is more stably arranged above the L-shaped slot SL and the metal back cover S. However, the present disclosure is not limited thereto. On the premise of having other fixing means, the fourth radiating portion AM2 may not have any recess AM21.

From the top view of FIG. 5, the middle radiating portion AM further includes the feeding portion AM3. The feeding portion AM3 is formed by branches from the branch point BP of the radiating portion AM1 along the first direction D1, and has a second feeding point FD2 electrically connected to the first feeding point FD1. The first feeding point FD1 and the second feeding point FD2 are electrically connected through the through hole which is electrically connected to the feeding portion AM3 and the L-shaped radiating portion AL at the same time.

The branch point BP is adjacent to the middle point of the third radiating portion AM1. More specifically, the distance between the branch point BP and a first edge AM11 and a second edge AM12 of the third radiating portion AM1 in the second direction D2 is at least one third of the total length of the third radiating portion AM1 in the second direction D2. A relative relationship between the branch point BP and the first edge AM11 and the second edge AM12 in FIG. 5 and FIG. 6 is only for illustration, and the present disclosure is not limited thereto. In optional embodiments, the distance between the branch point BP and the first edge AM11 is 1.5 to 2.5 times, preferably 1.5 to 2 times the distance between the branch point BP and the second edge AM12.

As a whole, the embodiments of the present disclosure provides the antenna structure A for mobile devices capable of covering the entire sub-6G frequency band. Specifically, in the present embodiment, the middle radiating element AM can be coupled with the L-shaped slot SL to generate a first frequency band. On the other hand, the third radiating portion AM1 can be configured to generate two types of frequency bands. Specifically, a portion of the third radiating portion AM1 extended from the branch point BP towards the inner corner SLC1 (i.e., a portion towards the first edge AM11) can be configured to generate a second frequency band, and a portion of the third radiating portion AM1 extended from the branch point BP towards the second direction D2 (i.e., a portion towards the second edge AM12) and a portion of the L-shaped radiating element AL can be configured to generate a third frequency band. Said portion of the L-shaped radiating element AL especially refers to the first radiating element AL1 from the feeding point towards the open end OP, which can be used to generate the third frequency band.

In some embodiments, the first frequency band, the second frequency band, the third frequency band, and the fourth frequency band are a low frequency band, an intermediate frequency band, a third-generation (3G) frequency band, and a fifth-generation (5G) frequency band distributed from low frequency to high frequency in sequence. More specifically, the low frequency band refers to a frequency band ranging from 617 MHz to 960 MHz, the middle frequency band refers to a frequency band ranging from 1710 MHz to 2690 MHz, and the 3G frequency band refers to a frequency band ranging from 3300 MHz to 4200 MHz. Moreover, when the capacitance value of the capacitor C1 is set within a predetermined range, it can be used to increase the bandwidth of the first frequency band (low frequency band). In optional embodiments, the capacitance of the capacitor C1 may be within a range of 0.1 pF to 10 pF, preferably within a range of 0.5 pF to 2 pF.

However, in order to cover the sub-6G frequency band more completely, the antenna structure A of the embodiments of the present disclosure further includes a grounded radiating element AG. Reference can be made to FIG. 5 and FIG. 6, the grounded radiating element AG may be coplanar with the third radiating portion AM1, arranged on the side of the third radiating portion AM1 close to the second partition SL2, and is extended along the second direction D2. As shown in FIG. 5, from the top view, the grounded radiating element AG also has a rectangular body and is substantially overlapped completely with and covered by the second partition SL2. In some embodiments, the length of the grounded radiating element AG in the second direction D2 is greater than its length in the first direction D1 but smaller than the total length of the third radiating portion AM1 in the second direction D2. In optional embodiments, the total length of the grounded radiating element AG in the first direction D1 may be within a range of 0.5 mm to 5 mm, preferably within a range of 1 mm to 4 mm. The total length of the grounded radiating element AG in the second direction D2 may be within a range of 3 mm to 9 mm, preferably within a range of 4 mm to 7 mm.

As shown in FIG. 5 and FIG. 6, the end of the grounded radiating element AG in the first direction D1 has a second grounded side AG1 that is grounded, and the grounded radiating element AG can also be arranged and fixed on the metal back cover S through the carrier plate H.

Therefore, in some embodiments, the position relationships of the L-shaped radiating element AL, the third radiating portion AM1, the fourth radiating portion AM2, the feeding portion AM3, and the grounded radiating element AG can be: the L-shaped radiating element AL is on the first plane; the third radiating portion AM1, the feeding portion AM3, and the grounded radiating element AG are on the second plane; the fourth radiating portion AM2 is on the third plane; the first plane is parallel to the second plane, and the third plane is perpendicular to the first plane and the second plane at the same time. The relative position relationship can be obtained from the schematic view of FIG. 6. In addition, the bottom grounded element BG can be connected to the grounded radiating element AG and the capacitor C1 at the same time and is extended in the second direction D2. The bottom grounded element BG can further be grounded through other grounded elements. The present disclosure does not limit the grounding method for the grounded radiating element AG and the capacitor C1 in the way of the bottom grounded element BG illustrated in FIG. 6.

Therefore, when the signal is input from the first feeding point FD1 and the second feed point FD2, the grounded radiating element AG can be coupled to generate the fourth frequency band. The first frequency band, the second frequency band, the third frequency band, and the fourth frequency band generated by the grounded radiating element AG as mentioned, may be a low frequency band, a middle frequency band, a 3G frequency band, and a 5G frequency band distributed from low frequency to high frequency in sequence. More specifically, the 5G frequency band refers to the frequency band ranging from 5150 MHz to 5925 MHz.

Figure 7:
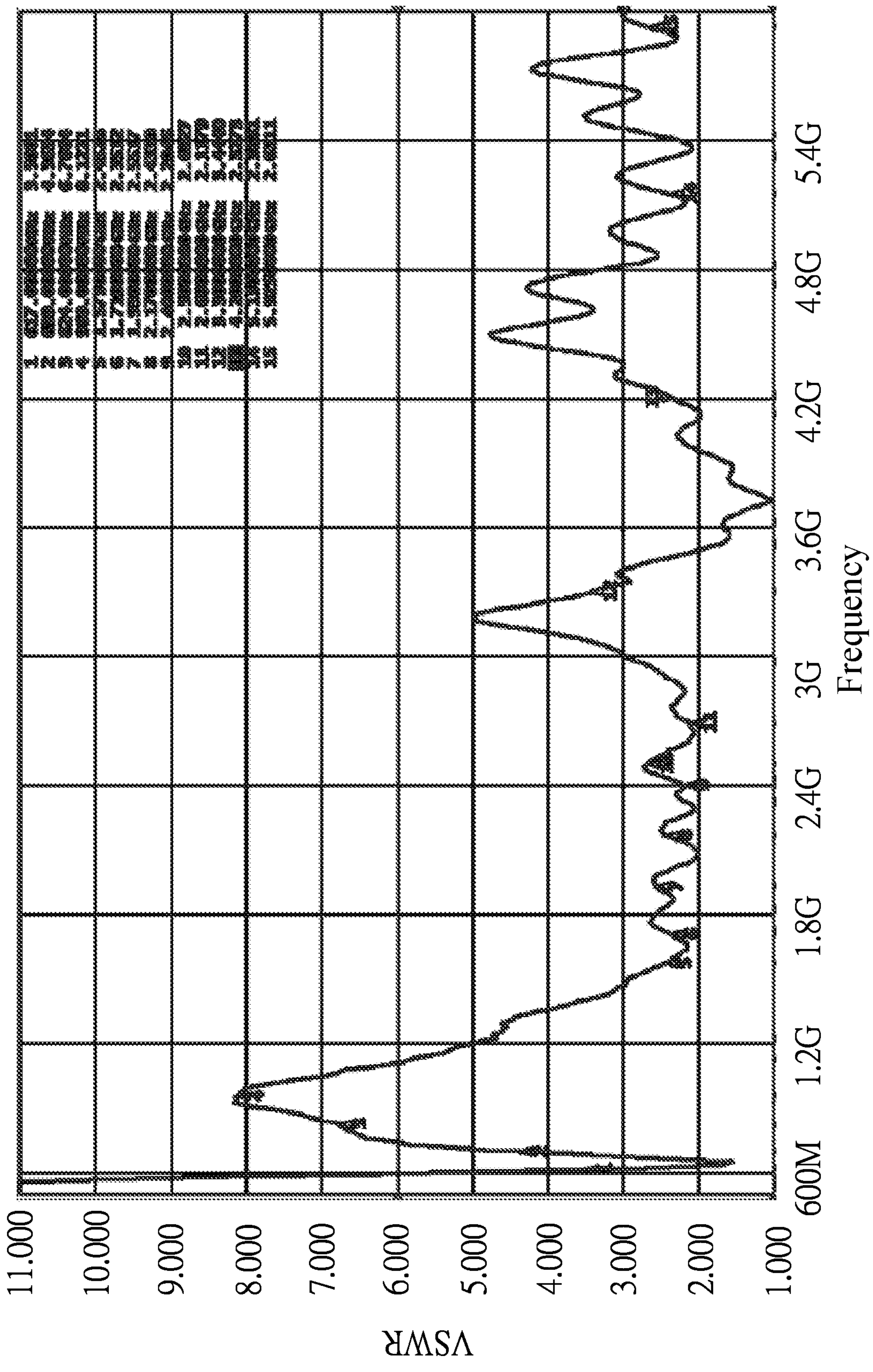
FIG. 7 is a curve diagram showing the antenna voltage standing wave ratio (VSWR) versus frequency of the antenna structure not adopting the configuration of a capacitor according to the embodiments of the present disclosure.
Figure 8:
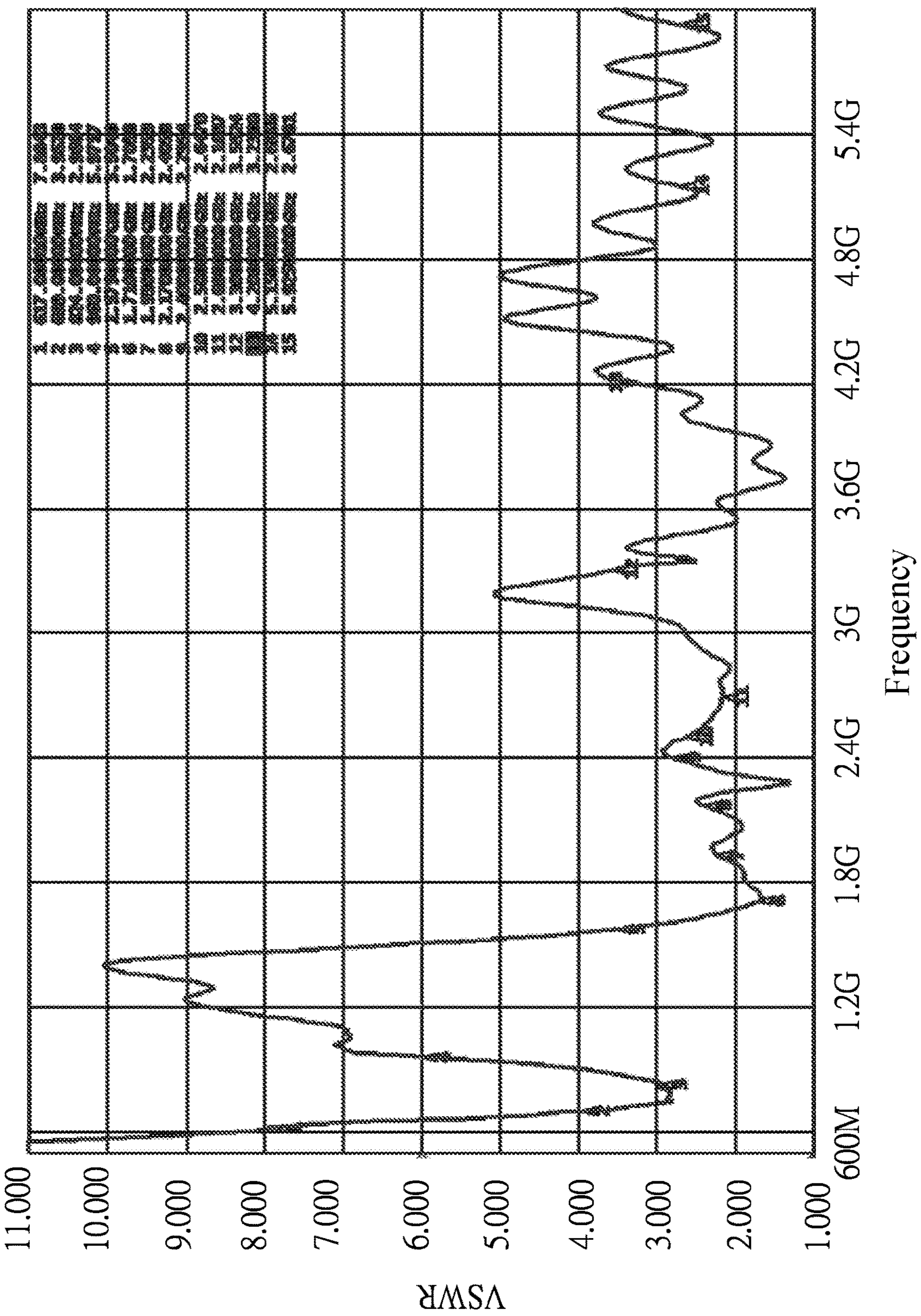
FIG. 8 is a curve diagram showing the antenna voltage standing wave ratio (VSWR) versus frequency of the antenna structure adopting the configuration of the capacitor according to the embodiments of the present disclosure.

Please refer to FIG. 7 and FIG. 8 together. FIG. 7 is a curve diagram showing the antenna voltage standing wave ratio (VSWR) versus frequency of the antenna structure A not adopting the configuration of the capacitor according to the embodiments of the present disclosure. FIG. 8 is a curve diagram showing the antenna voltage standing wave ratio (VSWR) versus frequency of the antenna structure adopting the configuration of the capacitor according to the embodiments of the present disclosure. As shown in FIG. 7 and FIG. 8, the voltage standing wave ratio (VSWR) (especially the low frequency band ranging from 617 MHz to 960 MHz) of the low frequency resonance mode of the antenna structure A can be effectively improved by the above configuration of the capacitance. From the curve of FIG. 8, one can see that after arranging the capacitor C1 (e.g., 1 pF), the VSWR of the antenna in the low frequency band can be optimized to be below 3 without affecting the modal characteristics of the intermediate frequency and high frequency. It shows that the antenna structure A adopting the capacitor in FIG. 8 can achieve a better antenna VSWR than the antenna structure in FIG. 7 without adopting the capacitor.

Beneficial Effects of the Embodiments

One of the beneficial effects of the present disclosure is that the antenna structure and its mobile device provided by the present disclosure not only provides an optimized full-bandwidth antenna in a limited mechanical space to make the antenna structure and its mobile device capable of being further expanded beyond the sub-6G frequency band, but also by setting a capacitor electrically connected to the L-shaped radiating element, the antenna voltage standing wave ratio in the low frequency band is optimized without affecting the modal characteristics of the middle frequency and high frequency.

The foregoing description of the disclosure has been presented only for the purposes of illustration and description option of the exemplary embodiments and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An antenna structure arranged on a metal back cover, the metal back cover having an L-shaped slot, the L-shaped slot having a first partition arranged along a first direction and a second partition arranged along a second direction, the first partition having an open end, the second partition having a closed end, and the first direction being perpendicular to the second direction, the antenna structure comprising:

an L-shaped radiating element partially overlapped with the second partition, comprising;

a first radiating portion extended along the second direction;

a second radiating portion extended along the second direction, and one end of the second radiating portion being connected to the first radiating portion, wherein a first feeding point is provided at a junction of the first radiating portion and the second radiating portion; and a grounded radiating portion extended along the first direction, wherein the grounded radiating portion is connected to another end of the second radiating portion and has a first grounded side, and the first grounded side is grounded through a capacitive element.

2. The antenna structure according to claim 1, further comprising:

a middle radiating element disposed between the L-shaped slot and the L-shaped radiating element, comprising:

a third radiating element extended along the second direction from an inner corner of the L-shaped slot;

a fourth radiating element disposed between the third radiating portion and the L-shaped radiating element, wherein the fourth radiating element is extended along the second direction, and is connected to and perpendicular to the third radiating portion; and a feeding portion formed by branching from a branch point of the third radiating portion along the first direction, wherein the feeding portion has a second feeding point electrically connected to the first feeding point; and a grounded radiating element being coplanar with the third radiating portion arranged on the side of the third radiating portion adjacent to the second partition, wherein the grounded radiating element is extended along the second direction, and the end of the grounded radiating element in the first direction has a second grounded side that is grounded;

wherein the middle radiating element is coupled to the L-shaped slot to generate a first frequency band, a portion of the third radiating portion extended from the branch point towards the inner corner is configured to generate a second frequency band, a portion of the third radiating portion extended from the branch point towards the second direction and the first radiating portion are configured to generate a third frequency band, the grounded radiating element is configured to generate a fourth frequency band, and the capacitive element is configured to increase a bandwidth of the first frequency band.

3. The antenna structure according to claim 2, further comprising a carrier plate arranged between the L-shaped radiating element and the middle radiating element, wherein the carrier plate has an upper surface, a lower surface, and a side surface connected between the upper surface and the lower surface; and wherein the L-shaped radiating element is arranged on the upper surface, the third radiating portion, the feeding portion, and the grounded radiating element are arranged on the lower surface, and the fourth radiating portion is arranged on the side surface.

4. The antenna structure according to claim 2, wherein the branch point is adjacent to the middle point of the third radiating portion, and the third radiating portion and the fourth radiating portion are not overlapped with the second partition of the L-shaped slot.

5. The antenna structure according to claim 2, wherein the grounded radiating portion is arranged adjacent to the closed end, and the end of the grounded radiating portion along the first direction is the first grounded side.

6. The antenna structure according to claim 2, wherein the first feeding point and the second feeding point are electrically connected through a through hole.

7. The antenna structure according to claim 2, wherein the third radiating portion and the fourth radiating portion have the same length along the second direction.

8. The antenna structure according to claim 2, wherein a length of the grounded radiating element along the second direction is smaller than the length of the third radiating portion along the second direction.

9. The antenna structure e according to claim 2, wherein the first frequency band, the second frequency band, the third frequency band, and the fourth frequency band are a low frequency band, an intermediate frequency band, a third-generation (3G) frequency band, and a fifth-generation (5G) frequency band distributed from low frequency to high frequency in sequence.

10. The antenna structure e according to claim 2, wherein the L-shaped radiating element is on a first plane, the third radiating portion, the feeding portion and the grounded radiating portion are on a second plane, the fourth radiating portion is on a third plane, the first plane is parallel to the second plane, and the third plane is perpendicular to the first plane and the second plane.

11. A mobile device comprising:

a metal back cover having an L-shaped slot, wherein the L-shaped slot has a first partition arranged along a first direction and a second partition arranged along a second direction, the first partition having an open end, the second partition having a closed end, and the first direction being perpendicular to the second direction;

an antenna structure arranged on the metal back plate, comprising:

an L-shaped radiating element partially overlapped with the second partition, comprising:

a first radiating portion extended along the second direction;

a second radiating portion, one end of the second radiating portion being connected to the first radiating portion and extended along the second direction, wherein a first feeding point is provided at a junction of the first radiating portion and the second radiating portion; and a grounded radiating portion extended along the first direction, wherein the grounded radiating portion is connected to an another end of the second radiating portion and has a first grounded side, and the first grounded side is grounded through a capacitive element;

a middle radiating element disposed between the L-shaped slot and the L-shaped radiating element, comprising:

a third radiating portion extended from an inner corner of the L-shaped slot along the second direction;

a fourth radiating portion disposed between the third radiating portion and the L-shaped radiating element, wherein the fourth radiating portion is extended along the second direction, and is connected to and perpendicular to the third radiating portion; and a feeding portion formed by branches from a branch point of the third radiating portion along the first direction, wherein the feeding portion has a second feeding point electrically connected to the first feeding point;

a grounded radiating element being coplanar with the third radiating portion arranged on the side of the third radiating portion adjacent to the second partition, wherein the grounded element is extended along the second direction, and the end of the grounded radiating element in the first direction has a second grounded side that is grounded;

wherein the middle radiating element and the L-shaped slot are coupled to generate a first frequency band, a portion of the third radiating portion extended from the branch point towards the inner corner is configured to generate a second frequency band, a portion of the third radiating portion extended from the branch point towards the second direction and the first radiating portion are configured to generate a third frequency band, the grounded radiating element is configured to generate the fourth frequency band, and the capacitive element is configured to increase a bandwidth of the first frequency band.

12. The mobile device according to claim 11, further comprising a carrier plate arranged between the L-shaped radiating element and the middle radiating element, wherein the carrier plate has an upper surface, a lower surface, and a side surface connected between the upper surface and the lower surface; and wherein the L-shaped radiating element is arranged on the upper surface, the third radiating portion, the feeding portion, and the grounded radiating element are arranged on the lower surface, and the fourth radiating portion is arranged on the side surface.

13. The mobile device according to claim 12, wherein the L-shaped radiating element, the middle radiating element, and the grounded radiating element are arranged and fixed on the metal back cover through the carrier plate.

14. The mobile device according to claim 11, wherein the branch point is adjacent to the middle point of the third radiating portion, and the third radiating portion and the fourth radiating portion are not overlapped with the second partition of the L-shaped slot.

15. The mobile device according to claim 11, wherein the grounded radiating portion is arranged adjacent to the closed end, and the end of the grounded radiating portion along the first direction is the first grounded side.

16. The mobile device according to claim 11, wherein the first feeding point and the second feeding point are electrically connected through a through hole.

17. The mobile device according to claim 11, wherein the third radiating portion and the fourth radiating portion have the same length along the second direction.

18. The mobile device according to claim 11, wherein a length of the grounded radiating element along the second direction is smaller than the length of the third radiating portion along the second direction.

19. The mobile device according to claim 11, wherein the first frequency band, the second frequency band, the third frequency band, and the fourth frequency band are a low frequency band, an intermediate frequency band, a third-generation (3G) frequency band, and a fifth-generation (5G) frequency band distributed from low frequency to high frequency in sequence.

20. The mobile device according to claim 11, wherein the L-shaped radiating element is on a first plane, the third radiating portion, the feeding portion, and the grounded radiating portion are on a second plane, the fourth radiating portion is on a third plane, the first plane is parallel to the second plane, and the third plane is perpendicular to the first plane and the second plane.

* * * * *